(12) United States Patent
Lease

(10) Patent No.: US 7,441,569 B2
(45) Date of Patent: Oct. 28, 2008

(54) WILL CALL WIRELESS TANK LEVEL MONITORING SYSTEM

(75) Inventor: Benjamin N. Lease, Knoxville, TN (US)

(73) Assignee: Robertshaw Controls Company, Richmond, VA (US)

(*) Notice: Subject to any disclaimer, the term of this patent is extended or adjusted under 35 U.S.C. 154(b) by 181 days.

(21) Appl. No.: 11/117,099

(22) Filed: Apr. 28, 2005

(65) Prior Publication Data
US 2006/0243345 A1 Nov. 2, 2006

(51) Int. Cl.
*B65B 1/30* (2006.01)
*E03B 7/07* (2006.01)
*G01F 19/00* (2006.01)

(52) U.S. Cl. ............... 141/95; 141/4; 141/83; 141/94; 141/192; 137/558; 73/1.73; 73/290 R

(58) Field of Classification Search .......... 141/2, 141/4, 83, 94, 95, 192; 137/386, 551, 558; 73/1.73, 447, 290 R, DIG. 5
See application file for complete search history.

(56) References Cited

U.S. PATENT DOCUMENTS

| | | | | |
|---|---|---|---|---|
| 4,571,998 | A * | 2/1986 | Stegner | 73/321 |
| 4,768,300 | A * | 9/1988 | Rutili | 40/546 |
| 4,815,824 | A * | 3/1989 | Sharples | 349/110 |
| 5,345,392 | A * | 9/1994 | Mito et al. | 713/300 |
| 5,486,914 | A * | 1/1996 | Denove et al. | 356/221 |
| 5,708,424 | A | 1/1998 | Orlando et al. | |
| 5,973,313 | A * | 10/1999 | Redford et al. | 250/210 |
| 6,336,362 | B1 * | 1/2002 | Duenas | 73/313 |
| 6,369,715 | B2 * | 4/2002 | Bennett et al. | 340/618 |
| 7,079,037 | B2 * | 7/2006 | Ross et al. | 340/618 |
| 2003/0028336 | A1 | 2/2003 | Masar et al. | |
| 2004/0129075 | A1 | 7/2004 | Sorenson | |
| 2005/0056090 | A1 | 3/2005 | McSheffrey, Jr. et al. | |
| 2006/0015543 | A1 * | 1/2006 | Humphrey | 707/202 |
| 2006/0036515 | A1 * | 2/2006 | Ingalsbe et al. | 705/28 |

FOREIGN PATENT DOCUMENTS

EP 1 353 154 A2 10/2003

OTHER PUBLICATIONS

Rochester Gauges, Inc.; Data Sheet; Rochester Remote Ready Dial & Hall Effect Module (ISO 9001 and QS-9000 Registered); www.rochestergauges.com; Jan. 21, 2005 Edition.

\* cited by examiner

*Primary Examiner*—Timothy L. Maust
(74) *Attorney, Agent, or Firm*—Reinhart Boerner Van Deuren P.C.

(57) ABSTRACT

A wireless tank level monitoring system is provided. The system includes a transmitter that is located in close proximity to the storage tank. The transmitter is coupled to a remote-ready tank level gauge, which provides a ratio-metric voltage output proportional to the liquid volume inside the tank. The transmitter periodically monitors the output from the level gauge and transmits the information to a base station located remotely from the storage tank. The base station displays the tank level numerically in percent full, graphically with a bar chart, or both. A conspicuous visual indication is provided by the base station when the tank level drops below a predetermined set point. In battery powered applications, the base station also reads and provides a visual indication of a low battery condition for both the transmitter and base station.

19 Claims, 3 Drawing Sheets

WILL CALL WIRELESS TANK LEVEL MONITORING SYSTEM

FIELD OF THE INVENTION

The present invention relates to tank level monitoring systems, and more particularly to wireless tank level monitoring systems for use with residential fuel tanks such as propane, water tanks, cisterns, etc.

BACKGROUND OF THE INVENTION

While most homes in an urban environment receive natural gas through a centralized distributed system throughout the city for use in heating their homes, most rural homes and farms rely on liquid fuel storage tanks installed on their property to supply the needed fuel for heating, cooking, etc. In such rural environments where a distributed pipeline system does not exist, fuel tank trucks actually deliver the fuel to the individual farms and residences, fill their onsite storage tanks, and leave. The users then draw from the tank as needed to supply their home and outbuildings with heat and for cooking, and occasionally for the generation of electricity. Often, the fuel of choice for these rural installations is liquid propane (LP), although fuel oil, natural gas, etc. may be used based on the installation and equipment installed on the farm or residence.

As the fuel in the storage tank is used for heating, cooking, etc. it will need to be refilled by the tank truck. Typically, there are two arrangements with the fuel company by which refueling is accomplished.

In a first arrangement, a rural customer contracts with the fuel company to make periodic deliveries to refuel the storage tank. Depending on the size of the tank installed at the rural location, such periodic deliveries may be scheduled weekly, monthly, etc. Typically, such deliveries are scheduled so that the customer will not have run out of fuel before the next scheduled delivery is made under an estimated maximum usage of the fuel by that customer. While such a scheduling attempts to preclude the possibility of running out of fuel in the tank, the rural customer pays a premium for such a service. This is because the rural customer often pays a fixed delivery charge regardless of the amount of fuel that is actually refilled into their storage tank. For example, if a warm spell occurs between scheduled deliveries and the user does not consume as much fuel as was estimated in establishing the delivery schedule, the rural user may actually need only a very small amount of fuel. Nonetheless, the user must pay the full delivery charge for having the fuel truck come to the installation.

Despite the premium paid by the user, such a scheduled delivery service also cannot guarantee that the user does not run out of fuel between scheduled deliveries. That is, if a particularly cold snap occurs between the scheduled deliveries or if the user simply uses more fuel during that period than has been typical, there is a possibility that the tank may run empty before the fuel truck returns to refuel the storage tank. As a result, the rural customer may be left without fuel for heating, cooking, etc.

A second type of arrangement between the fuel company and the rural customer is known as a will call arrangement. In such a will call arrangement, the user has responsibility for monitoring the level of fuel remaining in the tank and calling the fuel company to schedule the next delivery to preclude the tank from running empty. In such a will call system, the user is required to periodically check a gauge or dial installed on the storage tank to determine the amount of fuel left in the tank. When the amount of fuel drops below a certain level, the rural customer contacts the fuel company to request a delivery of fuel to refill the storage tank. Many rural customers like this will call arrangement because it minimizes the fixed delivery cost as a proportion of the amount of fuel needed to refill the tank because a delivery is only requested when refilling is necessary.

The problem with such a will call system is that it requires the user to physically go to the storage tank and read a gauge installed thereon. Since the storage tanks are not typically installed in close physical proximity to the residence, and since the largest usage of such fuel occurs during the winter and in extremely cold temperatures, the users are forced to be exposed to such cold temperatures, snow, etc. while they walk to the storage tank, read the gauge, and return to the residence. Because this chore is not pleasant during periods of extreme cold, users often put off checking their tanks. Unfortunately, the rate at which the user consumes this fuel is typically greater than normal during such periods. As a result, many users inadvertently run out of fuel before they can schedule a refill simply because they did not want to experience the unpleasantness of having to hike to their fuel storage tank during such bad weather. As a result, they may be forced to pay an extra emergency delivery charge or endure periods without heat until the delivery truck can return to refuel their storage tank.

There exists, therefore, a need in the art for a tank level monitoring system that does not require the user to endure harsh weather conditions while checking the fuel level in their tank in a will call service arrangement.

BRIEF SUMMARY OF THE INVENTION

In view of the above, it is an objective of the present invention to provide a new and improved tank level monitoring system that overcomes the above described and other problems existing in the art. More specifically, it is an objective of the present invention to provide a new improved wireless tank level monitoring system that may be used with residential fuel tank installations to provide remote indication of fuel tank level. As such, the wireless fuel tank level monitoring system alleviates the requirement that a user physically go to the storage tank to read the level gauge installed thereon.

In view of these objectives, an embodiment of the wireless tank level monitoring system includes a transmitter module and a base station. Preferably, the transmitter module is located at or on the fuel storage tank, and the base station is located within the user's dwelling or other convenient location easily accessible by the user. In a highly preferred embodiment, mounting of the transmitter module is accommodated by a plastic holster that may be installed on the storage tank, dome, lifting eye or gas line. The transmitter module uses a transducer that is coupled to a level sensing apparatus, such as a remote-ready tank level gauge, a Hall effect switch, a magneto-resistive sensor, etc. In one embodiment, the transmitter module continuously reads the output from the sensing apparatus, e.g. the remote-ready level gauge, Hall effect switch, etc., and transmits this information to the base station for display to the user. In preferred embodiments, however, to extend the operating life in battery operated embodiments, the transmitter sleeps, periodically waking to measure the level and transmit the reading to the base station.

The base station includes a radio frequency (RF) receiver and a small liquid crystal display (LCD). The base station may receive power from the residential electrical system, or preferably is battery powered. Information regarding the level of fuel remaining in the storage tank is displayed on the LCD numerically in percent of full, graphically with a bar chart, or preferably both numerically and graphically. In a preferred embodiment, a visual warning is provided when the tank level drops below a predetermined set point. In one embodiment the numeric, bar chart, or combined information is flashed at a predetermined rate until such time as the fuel level increases above the predetermined set point. In embodiments wherein both the transmitter and the base station are battery powered, the base station also includes an indication of low battery condition for both the receiver and the base station.

In an alternate embodiment, the transmitter module and the base station include transceiver circuitry to allow both transmission and reception of information and/or commands. In one such embodiment, the base station may transmit a request for tank level information. The transmitter module would then take a reading and transmit the tank level information to the base station. This feature could be in addition to or in place of the continuous and/or periodic reading and transmission of tank level information discussed above.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
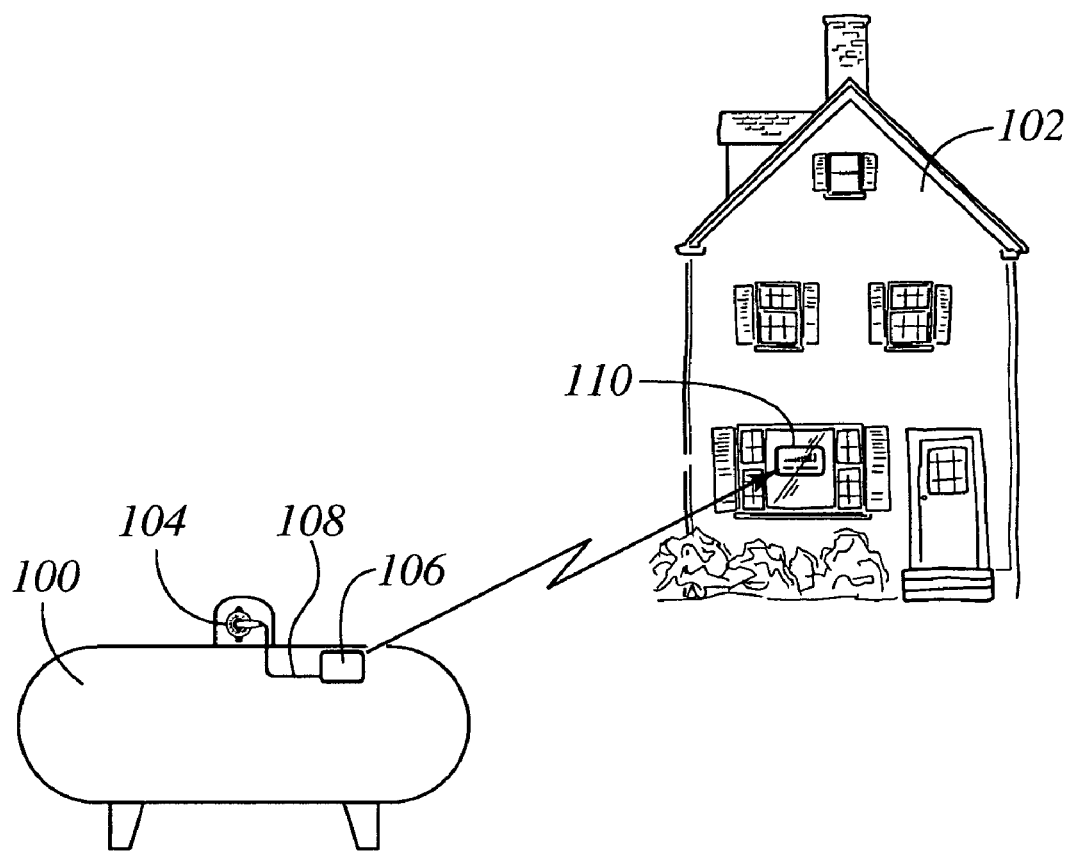
FIG. 1 illustrates a simplified operating environment in which the wireless tank level monitoring system of the present invention finds particular applicability.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In the description that follows, the system of the present invention will be described in an operating environment in which a rural residential customer utilizes liquid propane (LP) gas for heating, cooking, etc. In this operating environment, the rural customer utilizes an above-ground LP gas storage tank 100 to store the propane that it utilizes to heat his residence 102, with which to cook food, etc. As is typical, the LP storage tank 100 is located on the user's property at a location remote from the dwelling 102 for safety reasons. It should be recognized, however, that the particular type of fuel used by the residential customer is not limiting on the scope of the present invention. Indeed, the tank level sensing system of the present invention may be applied to water level sensing in, e.g., a cistern. As such, this operating environment is provided by way of illustration only, and not by way of limitation. Of course, different types of fuels and other liquids may require different types of fuel level sensing equipment, such equipment being well-known to those skilled in the art.

In one embodiment of the system of the present invention, the level of fuel remaining in the tank is displayed on a tank level gauge 104 that is installed on the fuel storage tank 100. In a preferred embodiment of the present invention, this tank level gauge 104 is a remote-ready gauge that provides a ratiometric voltage output proportional to the liquid volume inside the tank. One such remote-ready tank level monitor gauge that may be utilized in an embodiment of the present invention is the Rochester Remote-Ready Dial, $R^3D$, supplied by Rochester Gauges, Inc. This remote-ready dial includes a hall effect module that is designed to snap-fit into a recess in the remote-ready dial lens. Once installed, the module can provide ratiometric voltage output proportional to the liquid volume inside the tank. Other level sensing apparatus may be used, e.g., a Hall effect switch, a magneto resistive sensor, etc. as are well known in the art. A wireless transmitter module 106 that is coupled to the gauge 104 via wire 108 wirelessly transmits the tank level information to a base station module 110 that may be installed in the consumer's home 102, or other convenient location remote from the storage tank 100. This base station 110 displays the tank level information to the user so that the user may call to schedule a fuel delivery without having to hike to the remotely located storage tank 100.

In a preferred embodiment of the present invention, the wireless communication between the transmitter 106 and the base station 110 is accomplished at the 433 megahertz band using ASK modulation. In a typical consumer installation, the total link budget for the system is set such that the transmitter 106 and base station 110 can communicate over an open field line-of-sight distance of no less than 50 meters with the transmitter 106 and base station 110 at approximately 2 meters above the ground. However, those skilled in the art will recognize from this description that other frequency bands and modulation techniques can be utilized depending on the requirements of a particular installation and the restrictions set forth by the FCC or other governing agency, as well as power consumption rates and physical location of the residence 102 and the storage tank 100.

In the preferred embodiment of the present invention, the transmitter module 106, as illustrated in FIGS. 2-5, is connected to the remote-ready gauge 104 via, in a preferred embodiment, a 1.5 meter long wire 108. This wire 108 is sealed at both ends for continuous outdoor operation. The transmitter 106 is also designed for continuous outdoor exposure and is preferably certified intrinsically safe for operation in hazardous classified locations with continuous presence of propane vapors. In the embodiment of the transmitter 106 illustrated in FIGS. 2-5, the transmitter 106 operates on battery power, preferably 2 AA batteries, with a battery life of 2 years minimum. In order to achieve this battery life from 2 AA batteries, the transmitter 106 wakes only briefly to read the output from the gauge 104 and to transmit that information to the base station 110. To achieve an expected battery life of 2 years minimum of the transmitter battery, the duration of the period between reading and transmission cycles is set, in a preferred embodiment, at 90 seconds. However, this period may be adjusted based on consumer consumption rate of the fuel, etc.

However, the longer the duration of the sleep period of the transmitter 106, the greater the change in the displayed tank level on the base station 110 when the update is transmitted. As such, and to maintain confidence that the reading displayed on the base station 110 is accurate, the sampling and transmission intervals should be relatively short compared to the rate at which fuel is consumed from the storage tank 100. To maintain this confidence and to achieve the minimum 2 year life of the transmitter batteries, a preferred embodiment of the transmitter of the present invention wakes briefly every 90 seconds to read and transmit the tank level information to the base station 110.

Figure 2:
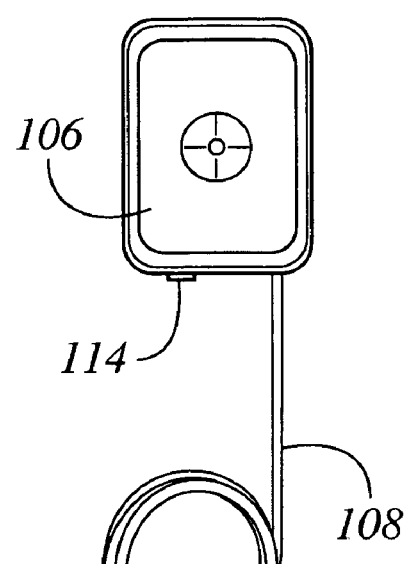
FIG. 2 is a front isometric illustration of a transmitter module coupled to a remote-ready tank level gauge used in an embodiment of the present invention.

As indicated above, the wire 108 must be suitable for continuous outdoor exposure, and preferably is sealed at both ends. To meet the operating requirements of a typical installation, this wire 108 is preferably a UL approved AWG 24 or larger gage wire. As illustrated in FIG. 2, the transmitter 106 interfaces with the gauge 104 via a transducer, e.g. a temperature compensated hall effect module 112. A magnetic coupling between the pointer magnet of the gauge 104 and the all effect module 112 is converted into an electrical signal that is read by the transmitter 106. This module 112 provides a ratiometric output that is converted within the transmitter 106 into a level reading that may be transmitted to the base station 110. In embodiments that utilize other level sensing apparatus, other transducers may be used, e.g. GMR, etc. Depending on whether the storage tank 100 is oriented in a horizontal or a vertical position, the sensor ratio metric output may correspond to a different percentage level reading of fuel in the tank. Therefore, the transmitter 106 adjusts for the orientation of the storage tank 100 in accordance with table 1 below. Alternatively, the setting of the tank orientation and the adjustment thereof may be done in the base station 110. A determination of the orientation of the fuel storage tank 100 may be made by selection of a selector switch 114.

TABLE 1

| Sensor Output Ratiometric (%) | Horizontal Cylinder Level Reading in % | Vertical Cylinder Level Reading in % |
| --- | --- | --- |
| 0 | 0 | 3 |
| 1 | 1 | 3 |
| 2 | 2 | 5 |
| 3 | 3 | 6 |
| 4 | 4 | 8 |
| 5 | 5 | 9 |
| 6 | 6 | 11 |
| 7 | 7 | 12 |
| 8 | 8 | 13 |
| 9 | 9 | 15 |
| 10 | 10 | 16 |
| 11 | 11 | 17 |
| 12 | 12 | 18 |
| 13 | 13 | 19 |
| 14 | 14 | 20 |
| 15 | 15 | 21 |
| 16 | 16 | 22 |
| 17 | 17 | 23 |
| 18 | 18 | 24 |
| 19 | 19 | 25 |
| 20 | 20 | 26 |
| 21 | 21 | 27 |
| 22 | 22 | 27 |
| 23 | 23 | 28 |
| 24 | 24 | 29 |
| 25 | 25 | 30 |
| 26 | 26 | 31 |
| 27 | 27 | 31 |
| 28 | 28 | 32 |
| 29 | 29 | 33 |
| 30 | 30 | 34 |
| 31 | 31 | 35 |
| 32 | 32 | 36 |
| 33 | 33 | 36 |
| 34 | 34 | 37 |
| 35 | 35 | 38 |
| 36 | 36 | 39 |
| 37 | 37 | 40 |
| 38 | 38 | 40 |
| 39 | 39 | 41 |
| 40 | 40 | 42 |
| 41 | 41 | 43 |
| 42 | 42 | 44 |
| 43 | 43 | 44 |
| 44 | 44 | 45 |
| 45 | 45 | 46 |
| 46 | 46 | 47 |
| 47 | 47 | 48 |
| 48 | 48 | 48 |
| 49 | 49 | 49 |
| 50 | 50 | 50 |
| 51 | 51 | 51 |
| 52 | 52 | 52 |
| 53 | 53 | 52 |
| 54 | 54 | 53 |
| 55 | 55 | 54 |
| 56 | 56 | 55 |
| 57 | 57 | 56 |
| 58 | 58 | 56 |
| 59 | 59 | 57 |
| 60 | 60 | 58 |
| 61 | 61 | 59 |
| 62 | 62 | 60 |
| 63 | 63 | 60 |
| 64 | 64 | 61 |
| 65 | 65 | 62 |
| 66 | 66 | 63 |
| 67 | 67 | 64 |
| 68 | 68 | 64 |
| 69 | 69 | 65 |
| 70 | 70 | 66 |
| 71 | 71 | 67 |
| 72 | 72 | 68 |
| 73 | 73 | 69 |
| 74 | 74 | 69 |
| 75 | 75 | 70 |
| 76 | 76 | 71 |
| 77 | 77 | 72 |
| 78 | 78 | 73 |
| 79 | 79 | 73 |
| 80 | 80 | 74 |
| 81 | 81 | 75 |
| 82 | 82 | 76 |
| 83 | 83 | 77 |
| 84 | 84 | 78 |
| 85 | 85 | 79 |
| 86 | 86 | 80 |
| 87 | 87 | 81 |
| 88 | 88 | 82 |
| 89 | 89 | 83 |
| 90 | 90 | 84 |
| 91 | 91 | 85 |
| 92 | 92 | 87 |
| 93 | 93 | 88 |
| 94 | 94 | 89 |
| 95 | 95 | 91 |
| 96 | 96 | 92 |
| 97 | 97 | 94 |
| 98 | 98 | 95 |
| 99 | 99 | 97 |
| 100 | 100 | 99 |

Figure 5:
FIG. 5 is a top view isometric illustration of the transmitter of FIG. 2.
Figure 4:
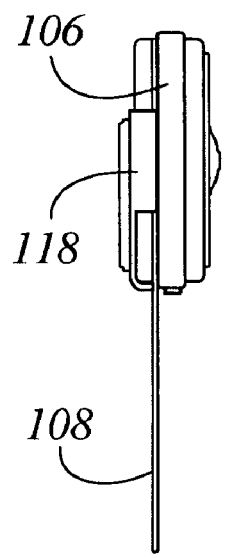
FIG. 4 is an isometric side view of the transmitter of FIG. 2.
Figure 3:
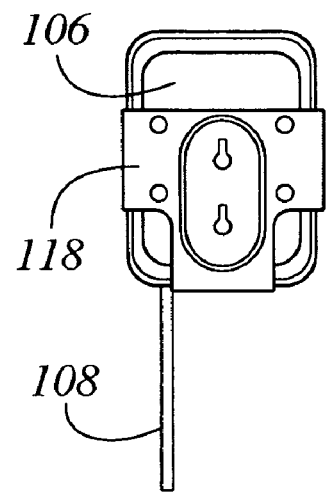
FIG. 3 is a rear isometric illustration of the transmitter module of FIG. 2 illustrating a mounting holster for use therewith.
Figure 3:
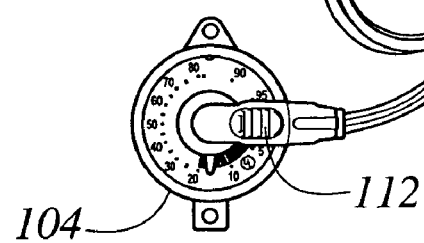

As may be seen in FIGS. 3-5, a holster 118 may be used to hold the transmitter module 106. This holster 118 may be made of plastic or other material, and may be mounded to the propane tank, dome, lifting eye, gas line, etc. as appropriate. Once mounted, the holster 118 removably secures the transmitter 106 therein.

Figure 6:
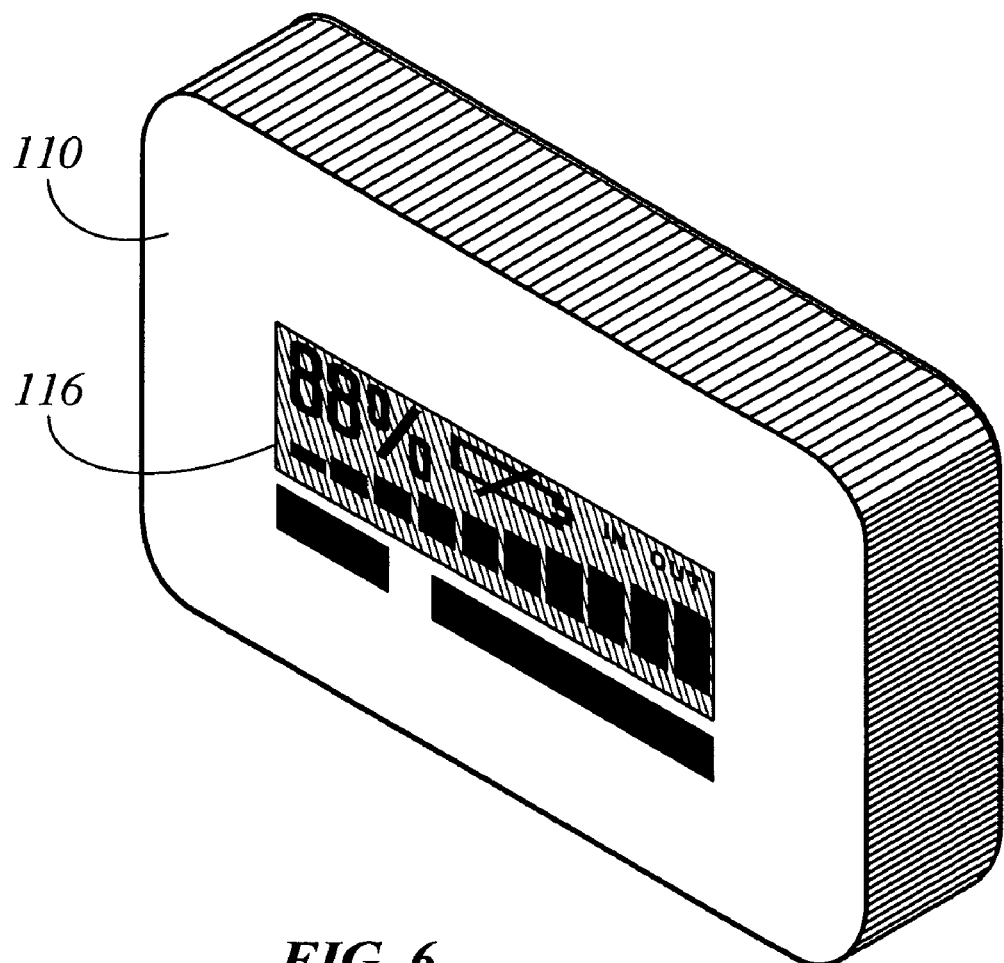
FIG. 6 is an isometric illustration of an embodiment of a base station for use with the system of the present invention.

As illustrated in FIG. 6, the base station 110 is a compact unit designed for indoor operation. While one embodiment of the base station 110 is powered from the electrical system within the dwelling 102, a preferred embodiment utilizes battery power, preferably 2 AAA batteries for power. In a preferred embodiment of the present invention, the base station 110 has a battery life of approximately 1.5 years minimum. The base station 110 includes an RF receiver and a small liquid crystal display (LCD) 116. In one embodiment, the base station 110 can communicate with only one remote transmitter 106. In such an embodiment, if multiple tanks are to be monitored in a given location, then a separate base station 110 must be used for each tank. In an alternate embodiment of the present invention, the base station may include a larger display capable of displaying multiple tank level indications, may simply provide the user with the ability to select different tanks being monitored, or may periodically scroll through the information for the different tanks.

In one embodiment of the present invention, the level reading received from transmitter 106 is displayed on the base station LCD 116 numerically in percent full with a resolution of 1%. Additionally or alternatively, the LCD 116 may also include a graphic indication of the level reading utilizing, e.g., a bar chart at a resolution of 10%. In a highly preferred embodiment of the present invention, the base station 110 provides a visual indication once the level of the tank drops below a predetermined set point, e.g. the 25% point. In one embodiment, both the bar chart and the numeric level reading will flash at a given rate, preferably 1 hertz, until which time the level increase to above the 25% point. In embodiments having a backlit LCD, the backlighting may also be utilized to provide the visual indication either continuously, or flashing.

The LCD 116 also includes an indication of low battery condition in embodiments utilizing battery power. In the embodiment illustrated in FIG. 6, a low battery icon is used, while in the configuration illustrated in FIG. 7 a "LOW BAT" verbal message is used. In each of these embodiments, both an "IN" and an "OUT" icon are also utilized to designate the base station battery and the transmitter battery, respectively. In operation when the transmitter indicates that it is experiencing a low battery condition, the base station 110 displays the "OUT" icon along with the low battery icon. If, instead, the base station detects a low battery condition, it will display the "IN" icon and the low battery icon. In this way, the user is prompted to change the battery of either the transmitter or the base station as the case may be. In the event that both the transmitter and the base station have low batteries, all three of the icons will be activated.

Figure 7:
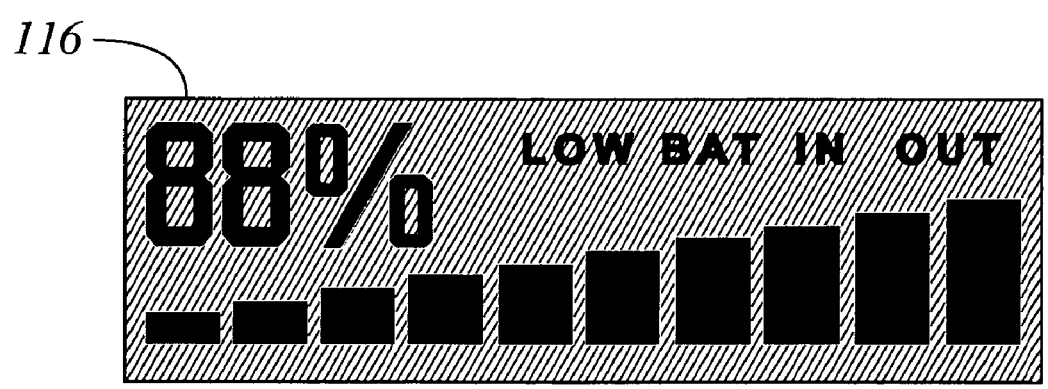
FIG. 7 illustrates an alternate LCD layout for use in an alternate embodiment of the base station of the present invention.

In an embodiment of the present invention that utilizes the graphic display for tank level in the form of a bar chart having 10 segments as illustrated in FIGS. 6 and 7, and with a 1% resolution being proved by the transmitter 106, each segment of the bar chart can equate to approximately 10% of the tank level. In one embodiment, all 10 segments will be displayed when the tank level is greater than or equal to 98% of the full capacity. Nine segments will be displayed when the tank level is greater than or equal to 90. An additional segment of the display will be removed for each 10% drop in fuel level until a single bar remains when the tank level is greater than or equal to 10%. Once the level drops to approximately 5%, no icons will be displayed in the graphic bar chart. As discussed above, a preferred embodiment will provide a visually conspicuous indication, e.g. flash the bar graph segments at a predetermined rate, when the level drops below the predetermined low tank level, e.g. 25%.

In an alternate embodiment, the transmitter module 106 and the base station 110 include transceiver circuitry to allow both transmission and reception of information and/or commands. In one such embodiment, the base station 110 may transmit a request for tank level information. The transmitter module 106 would then take a reading and transmit the tank level information to the base station 110. This allows the user to obtain a current tank level reading on demand. Preferably, the current tank level is displayed for a short period of time, and then the display 116 is cleared. This prevents stale information from being displayed. This feature could be in addition to or in place of the continuous and/or periodic reading and transmission of tank level information discussed above. Other commands that that base station 110 may send to the transmitter module 106 include information to set the period between automatic readings, etc. To minimize the risk of running out of fuel because the user simply forgets to check the tank level in this embodiment, the transmitter module 106 may still perform the periodic tank level checks and transmit a warning message to the base station 110 when the tank level falls below a predetermined set point. The base station 110 would then display the tank level automatically and provide the conspicuous indication as discussed above to alert the user to the low fuel situation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary langauge (e.g., "such as") provided herein, is intended merely to better illuminate the invention and does not pose a limitation on the scope of the invention unless otherwise claimed. No langauge in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A remote tank level display system for displaying a tank level at a remote location, the tank having a level sensing apparatus installed thereon, comprising:
    a transmitter module adapted to be positioned in proximity to the tank, the transmitter module in communication with the level sensing apparatus to receive tank level information therefrom;
    a base station adapted to be mounted on a wall and in wireless radio frequency (RF) communication with the transmitter module, the base station including a fixed segment liquid crystal display (LCD) for displaying the tank level received from the transmitter module; and
    a mounting holster affixed to the tank and adapted to removably secure the transmitter module therein.

2. A remote tank level display system for displaying a tank level at a remote location, the tank having a level sensing apparatus installed thereon, comprising:
    a transmitter module adapted to be positioned in proximity to the tank, the transmitter module in communication with the level sensing apparatus to receive tank level information therefrom;
    a base station adapted to be mounted on a wall and in wireless radio frequency (RF) communication with the transmitter module, the base station including a fixed segment liquid crystal display (LCD) for displaying the tank level received from the transmitter module; and
    a transducer affixed to the level sensing apparatus, the transducer providing a ratiometric voltage output to indicate tank level.

3. A remote tank level display system for displaying a tank level at a remote location, the tank having a level sensing apparatus installed thereon, comprising:
    a transmitter module adapted to be positioned in proximity to the tank, the transmitter module in communication with the level sensing apparatus to receive tank level information therefrom;
    a base station adapted to be mounted on a wall and in wireless radio frequency (RF) communication with the transmitter module, the base station including a fixed segment liquid crystal display (LCD) for displaying the tank level received from the transmitter module;
    a transducer affixed to the level sensing apparatus, the transducer providing a ratiometric voltage output to indicate tank level; and
    wherein the transmitter module includes a tank orientation switch and the transducer includes a Hall effect module that generates the ratiometric voltage output, and wherein the transmitter module calculates the tank level based on the ratiometric voltage output of the Hall effect module and a position of the tank orientation switch.

4. The system of claim 3, wherein the transmitter module periodically reads and transmits the tank level to the base station.

5. The system of claim 4, wherein the transmitter module enters a sleep mode between periodically reading and transmitting the tank level to the base station.

6. The system of claim 3, wherein the transmitter module is battery powered, wherein the transmitter module transmits low battery information to the base station, and wherein the base station displays the low battery information from the transmitter on the display.

7. The system of claim 3, wherein the LCD displays a segmented chart that varies to correspond to the tank level.

8. The system of claim 2, wherein the LCD provides a visual indication of a low tank level condition.

9. The system of claim 8, wherein the visual indication includes flashing the tank level displayed on the LCD.

10. The system of claim 8, wherein the visual indication includes illumination of a backlight of the LCD.

11. The system of claim 3, wherein the LCD of the base station displays the tank level in numeric form as a percent full.

12. The system of claim 3, wherein the LCD of the base station displays the tank level in graphic form.

13. The system of claim 3, wherein the LCD of the base station displays the tank level in numeric form as a percent full and in graphic form.

14. The system of claim 3, wherein the base station is battery powered, and wherein the base station displays a low battery condition indication when a low battery condition is detected.

15. The system of claim 3, wherein the transmitter module receives commands from the base station.

16. A method of displaying a level of a tank at a remote location, comprising the steps of:
    monitoring a tank level in proximity to the tank;
    wirelessly transmitting information regarding the tank level using a radio frequency (RE) transmitter;
    receiving the information at the remote location using a RE receiver; and
    displaying the information on a fixed segment liquid crystal display (LCD) for a user utilizing the tank; and
    wherein the step of monitoring comprises the steps of:
    generating a ratiometric voltage proportional to the level of the tank;
    determining an orientation of the tank;
    calculating the information regarding the tank level based on the ratiometric voltage and the orientation of the tank.

17. The method of claim 16, wherein the step of displaying the information comprises the step of displaying the information in numeric form as a percent frill and in graphic form.

18. The method of claim 16, further comprising the step of providing a visual indication of a low tank condition.

19. A remote tank level display system for displaying a level of a propane tank at a remote location, the tank having a tank level monitor installed thereon, comprising:
    a Hall effect module in magnetic communication with the tank level monitor;
    a transmitter module coupled to the Hall effect module and receiving a ratiometric voltage therefrom, the transmitter module including a tank orientation switch, and wherein the transmitter module calculates the tank level based on the ratiometric voltage and a position of the tank orientation switch; and
    a base station in wireless communication with the transmitter module, the base station including a fixed segment liquid crystal display for displaying information indicative of the tank level received from the transmitter module.

* * * * *